(12) United States Patent
Savaria et al.

(10) Patent No.: US 6,203,266 B1
(45) Date of Patent: Mar. 20, 2001

(54) POWER SAFETY BARRIER FOR WHEELCHAIR LIFT

(75) Inventors: Pierre Savaria, St-Eustache (CA); Dante Vincent DeLeo, Tarzana, CA (US)

(73) Assignee: Ricon Corporation, Panorama City, CA (US)

( * ) Notice: Subject to any disclaimer, the term of this patent is extended or adjusted under 35 U.S.C. 154(b) by 0 days.

(21) Appl. No.: 08/958,651

(22) Filed: Oct. 27, 1997

(51) Int. Cl.[7] ........................................... G60P 1/44
(52) U.S. Cl. .................. 414/546; 414/921; 414/540; 414/917; 188/36
(58) Field of Search ..................... 414/921, 584, 414/539, 540, 545, 546, 556, 557, 917, 401, 396; 254/2 R, 2 C; 188/36; 187/222; 105/445, 447, 448

(56) References Cited

U.S. PATENT DOCUMENTS

| | | |
|---|---|---|
| 4,124,130 | 11/1978 | Rohrs et al. . |
| 4,442,921 | 4/1984 | Sherman . |
| 4,556,128 | 12/1985 | Thorley et al. . |
| 4,907,936 * | 3/1990 | Bourdage ............................ 414/545 |
| 4,984,955 * | 1/1991 | McCullough ................... 414/921 X |
| 5,040,936 | 8/1991 | Rhea . |
| 5,105,915 * | 4/1992 | Gary ................................ 414/921 X |
| 5,180,275 * | 1/1993 | Czech et al ..................... 414/921 X |
| 5,401,135 | 3/1995 | Stoen et al. . |
| 5,439,342 | 8/1995 | Hall et al. . |
| 5,556,250 | 9/1996 | Fretwell et al. . |

* cited by examiner

*Primary Examiner*—Frank E. Werner
(74) *Attorney, Agent, or Firm*—Thomas I. Rozsa; Tony D. Chen; Jerry Fong (57) ABSTRACT

A vehicular wheelchair lift with a power controlled safety barrier for physically blocking a wheelchair from inadvertently rolling off a platform of the wheelchair lift during use. The power safety barrier utilizes a linkage mechanism to open or close a roll stop. The linkage mechanism includes a pair of linkage bars and a flexible linkage member to mechanically connect the roll stop to a power actuating device. The roll stop is pivotably mounted to an outer end of the platform. The roll stop is required to open and close relative to the platform according to the relative platform positions. When the platform is in the ground position, the roll stop is opened substantially in a horizontal plane and is an extension of the platform for unloading the wheelchair. In the powered control aspects, during the wheelchair lift transition period when platform is off the ground position, the roll stop is actuated to the closed position before the wheelchair lift can be operated. Reversely, during the wheelchair lift transition period when the platform is lowered to the ground, the roll stop cannot be actuated to the open position until the platform has reached the ground position.

24 Claims, 9 Drawing Sheets

POWER SAFETY BARRIER FOR WHEELCHAIR LIFT

BACKGROUND OF THE INVENTION

1. Field of the Invention

The present invention generally relates to the field of vehicular wheelchair lifts for persons who are physically challenged or otherwise have limited mobility. More particularly, the present invention relates to the field of vehicular wheelchair lifts with an automatic safety barrier for preventing a wheelchair from inadvertently rolling off a platform of the wheelchair lift in the boarding and exiting of a vehicle.

2. Description of the Prior Art

Vehicular wheelchair lifts are widely utilized to assist persons in wheelchairs to enter and exit vehicles. These lifts typically have a platform for transporting an occupied wheelchair, where the platform can be raised and lowered between a loading position at the ground level outside a vehicle and an entry position at the floor level inside the vehicle, and a safety barrier connected to an outer end of the platform for preventing a wheelchair from inadvertently rolling off the platform during use of the wheelchair lift.

While many of the prior art safety barriers have accomplished in minimizing the risk for injury to users of the wheelchair lifts on which they are installed, a need has developed for even greater security in this respect. Many prior art barriers currently in use are subject to the possibility that they may not always be operative by both power and manual controls. Some prior art safety barriers are not strong enough to positively assure against accident and resultant injury. These safety barriers stop to prevent objects from sliding or rolling off the lifts and are well known as disclosed in the following prior art patents below.

U.S. Pat. No. 5,556,250 issued to Fretwell et al. on Sep. 17, 1996 discloses a wheelchair lift with a power roll stop actuated by a separate motor drive mechanism. If power or the motor becomes inoperable by any reason, disassembly some linkage parts in the motor drive mechanism is a must in order to, manually open and close the roll stop.

U.S. Pat. No. 4,124,130 issued to Rohrs et al. on Nov. 7, 1978 discloses a wheelchair lift with a safety barrier. The safety barrier is not power controlled.

U.S. Pat. No. 5,040,936 issued to Rhea on Aug. 20, 1991 discloses a wheelchair lift with a foldable safety barrier. The safety barrier is not power controlled.

U.S. Pat. No. 4,556,128 issued to Thorley et al. on Dec. 3, 1985 discloses a wheelchair lift with a power safety barrier. The safety barrier is actuated by a hydraulic cylinder. If the hydraulic power or any element becomes inoperable, the safety barrier cannot be opened and closed manually.

U.S. Pat. No. 5,439,342 issued to Hall et al. on Aug. 8, 1995 discloses a platform wheelchair lift with a safety barrier actuation mechanism. The actuation mechanism is driven by a hydraulic cyliner. The barrier cannot be opened and closed manually in the event of a power failure.

U.S. Pat. No. 4,442,921 issued to Sherman on Apr. 17, 1984 discloses a wheelchair platform lift with a safety barrier. The barrier is actuated by a barrier pivotal latch mechanism without power control.

U.S. Pat. No. 5,401,135 issued to Stoen et al. on Mar. 28, 1995 discloses a wheelchair lift with a safety barrier. The barrier opens and closes by a barrier pivotal latch mechanism without power control.

It is desirable to provide a wheelchair lift with a power controlled safety barrier for facilitating the entrance and exit of persons who are physically challenged or otherwise have limited mobility into or from a vehicle which significantly improves the safety of the wheelchair lift. It is also desirable to provide a wheelchair lift with a power controlled safety barrier which eliminates risks attributable to a wheelchair inadvertently rolling off a platform of the wheelchair lift during use.

SUMMARY OF THE INVENTION

The present invention is a vehicular wheelchair lift with a power controlled safety barrier for physically blocking a wheelchair from inadvertently rolling off a platform of the wheelchair lift during use. The power safety barrier utilizes a linkage mechanism for lowering or raising a roll stop. The linkage mechanism includes a pair of linkage bars and a flexible linkage member to mechanically connect the roll stop to a power actuating means, such as a motor drive assembly.

Specifically, the roll stop is pivotably mounted at an outer end of the platform of the vehicular wheelchair lift. The roll stop is required to open and close relative to the platform according to the relative platform positions. The wheelchair lift usually has three interval lift positions which includes a stowed position, an entry position in which the platform has reached a vehicle floor level, and a ground position. In the entry position and between the entry and ground positions, the roll stop is in a closed position substantially vertical to the platform for loading a wheelchair. When the platform is in the ground position, the roll stop is opened substantially in a horizontal plane and relatively coplanar to the platform and is an extension of the platform for unloading the wheelchair.

In the powered control aspects, during the wheelchair lift transition period when the platform is off the ground position, the roll stop is actuated to the closed position before the wheelchair lift can be operated. Reversely, during the wheelchair lift transition period when the platform is lowered to the ground, the roll stop cannot be actuated to the open position until the platform has reached the ground position.

The unique feature of the present invention is that, unlike the prior art safety barriers, the present invention safety barrier can be operated in either an automatic powered control mode or manual control mode under the same simple structure. No additional parts are required to be added to the structure to perform both modes. In addition, there is no need to further assemble or disassemble the linkage mechanism in the structure from one control mode (such as power control) to the other (such as manual control).

It is an object of the present invention to provide a vehicular wheelchair lift with a power controlled safety barrier which automatically opens and closes a roll stop relative to a platform of the wheelchair lift according to the relative platform positions.

It is also an object of the present invention to provide a vehicular wheelchair lift with a power controlled safety barrier which can be operated in either an automatic powered control mode or manual control mode under the same simple structure.

It is a further object of the present invention to provide a vehicular wheelchair lift with a power controlled safety barrier which includes a linkage mechanism having a pair of linkage bars and a flexible linkage member to mechanically connect the roll stop to a power actuating means for opening or closing the roll stop.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
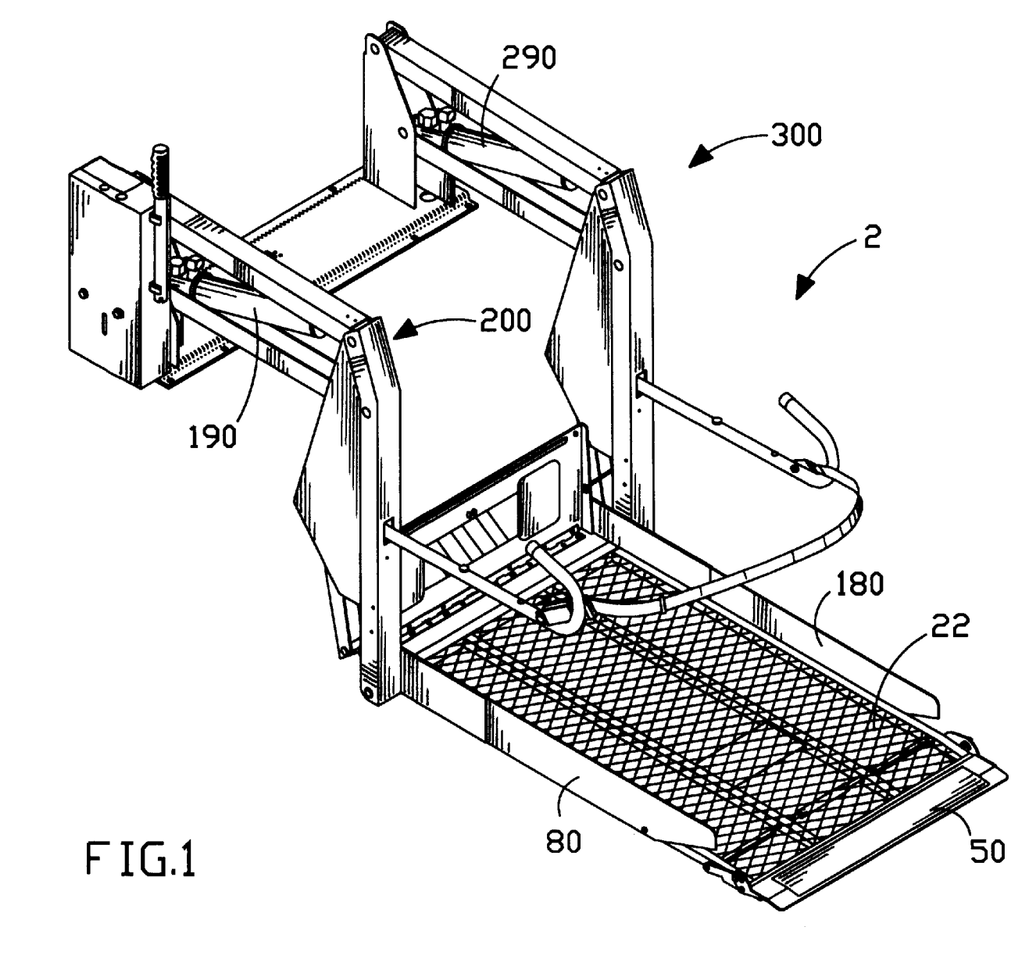
FIG. 1 is a perspective view of a conventional wheelchair lift wherein the present invention power controlled safety barrier can be incorporated thereto.

Referring to FIG. 1, there is shown at 2 a conventional wheelchair lift which comprises a platform 22 located in a ground position with an outer roll stop 50 fully opened. Two opposite side panels 80 and 180 are relatively mounted on opposite sides of the platform 22 to prevent a wheelchair from rolling off the sides of the platform 22. The platform 22 can be lifted upwardly and downwardly among a stowed position (not shown), an entry position (not shown) and the ground position by a pair of opposite hydraulic actuators 190 and 290 mounted on two relative parallelogram linkage structures 200 and 300. The wheelchair lift 2 can be adapted to have the present invention power controlled safety barrier or power roll stop. It will be appreciated that the present invention power controlled safety barrier can be applied to many other kinds of wheelchair lifts which require the outer roll stop 50.

Figure 2:
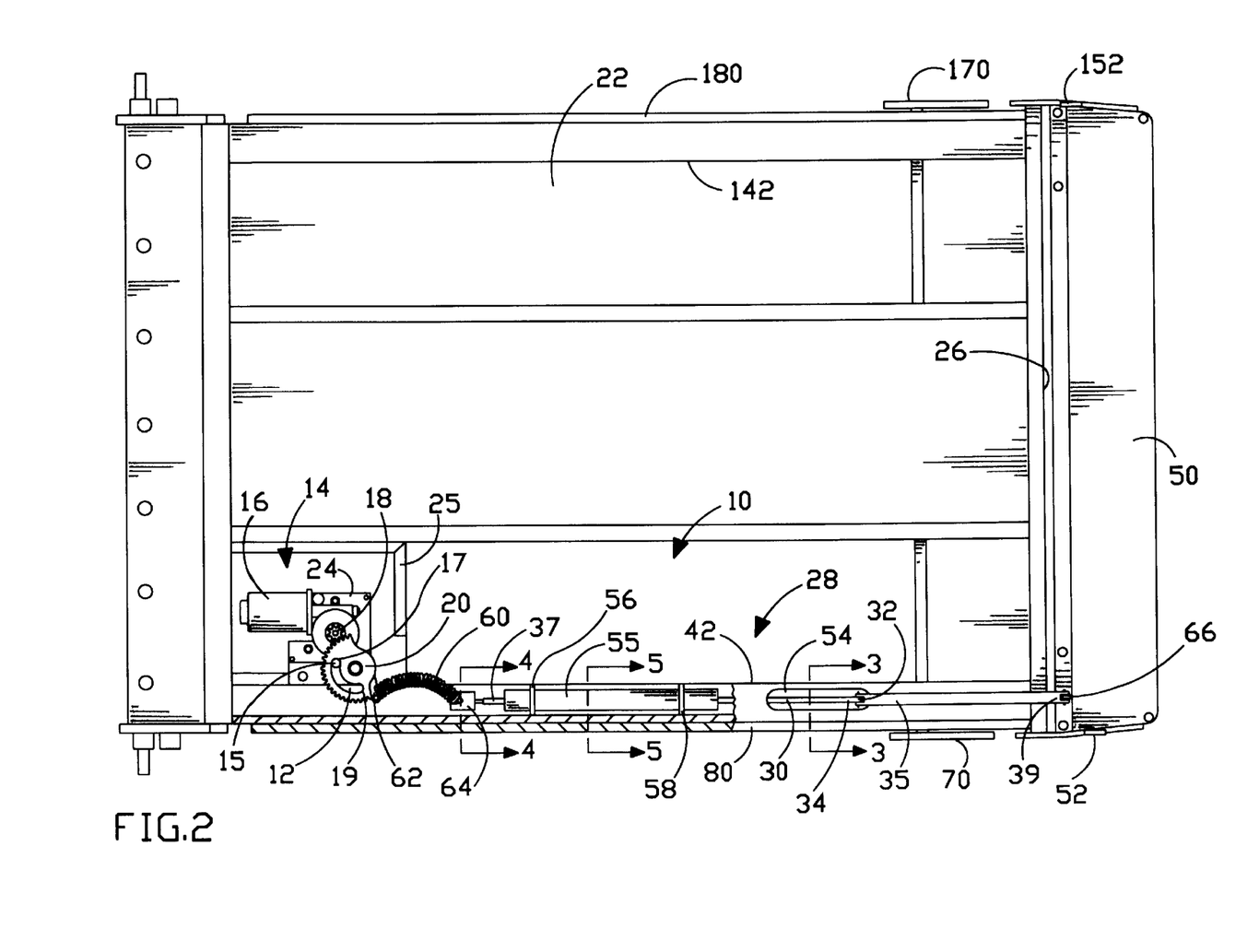
FIG. 2 is a top plan view of a platform of a wheelchair lift, showing the present invention power controlled safety barrier incorporated thereto, with a roll stop in an opened position.
Figure 3:
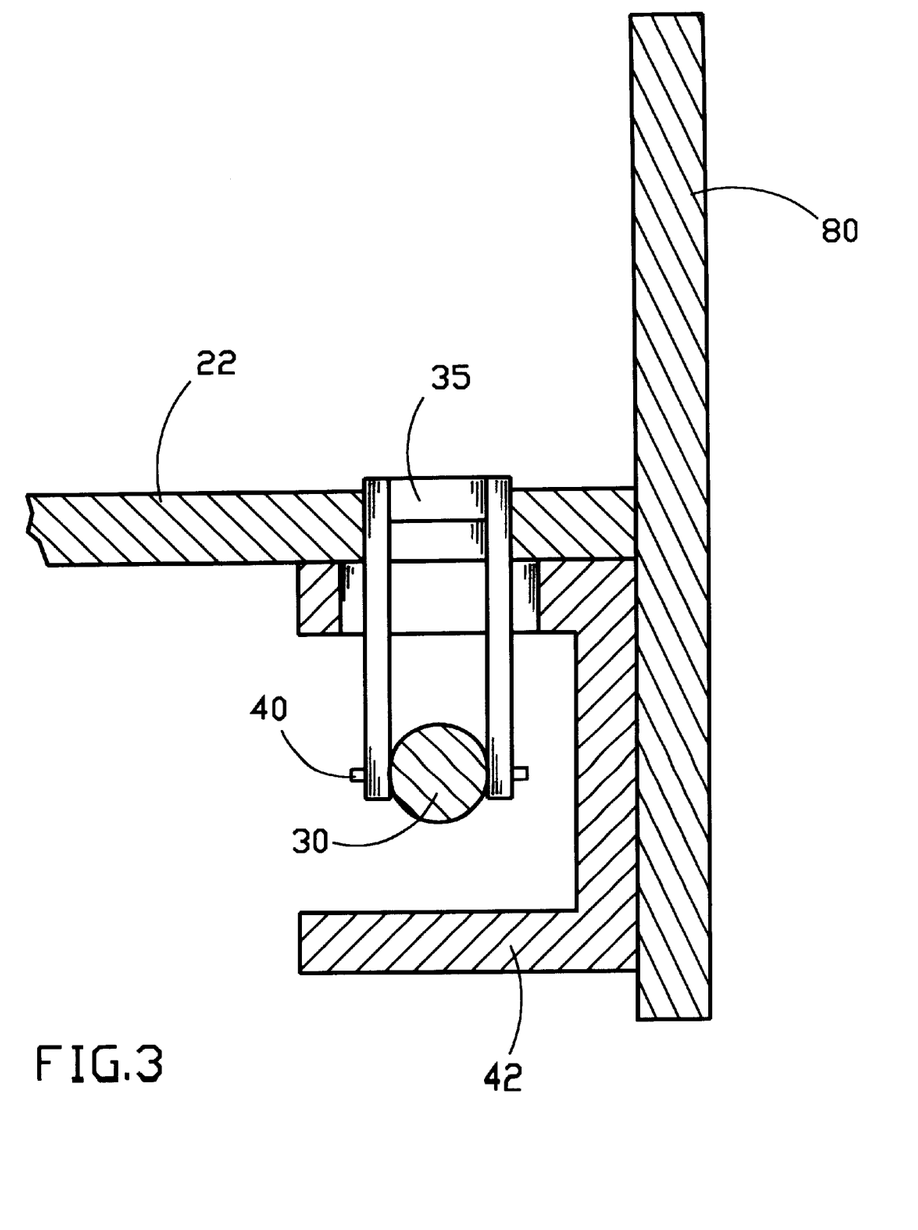
FIG. 3 is an enlarged cross-sectional view taken along line 3—3 of FIG. 2.
Figure 6:
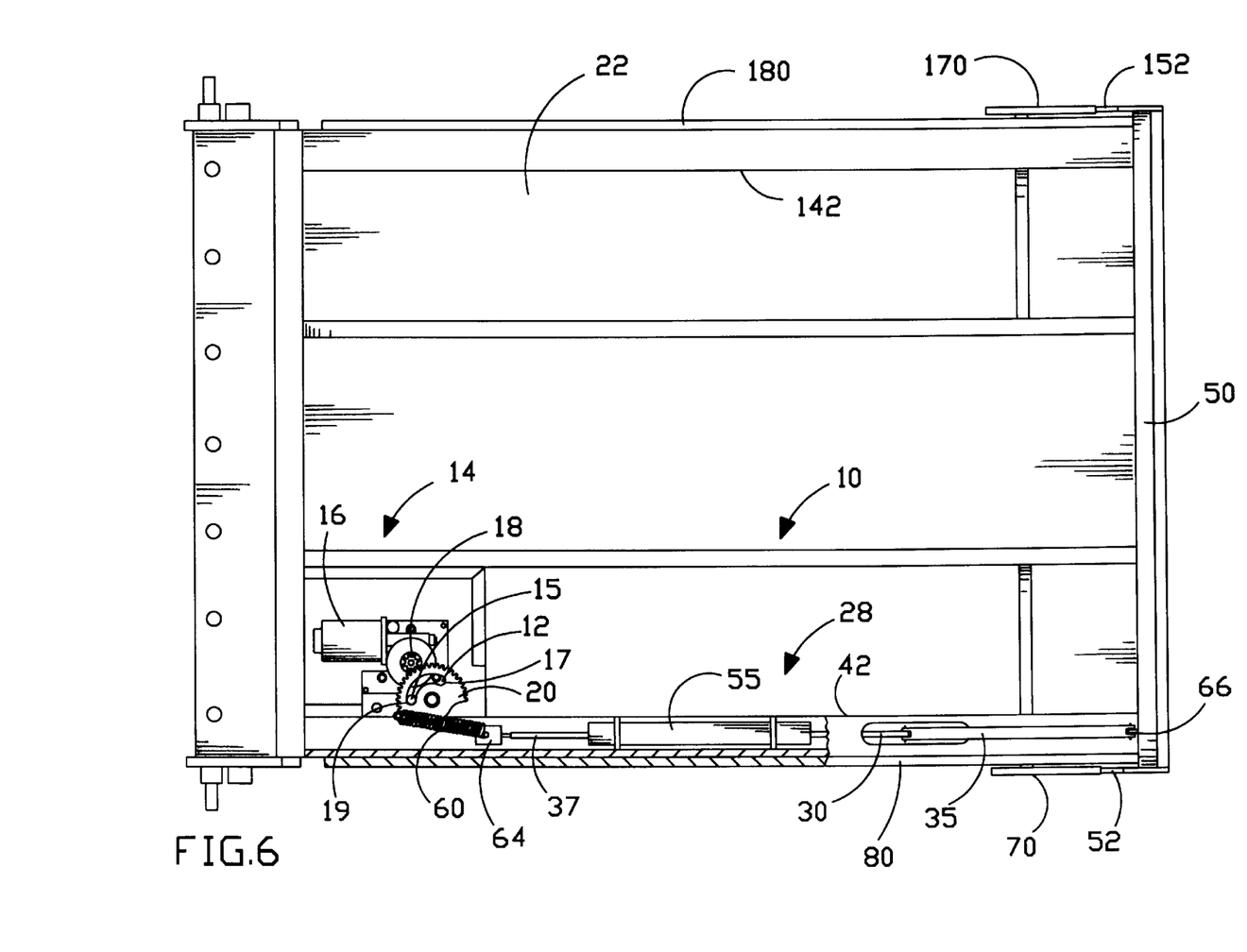
FIG. 6 is a top plan view of the platform of the wheelchair lift, showing the present invention power controlled safety barrier incorporated thereto, with the roll stop in a closed position.
Figure 7:
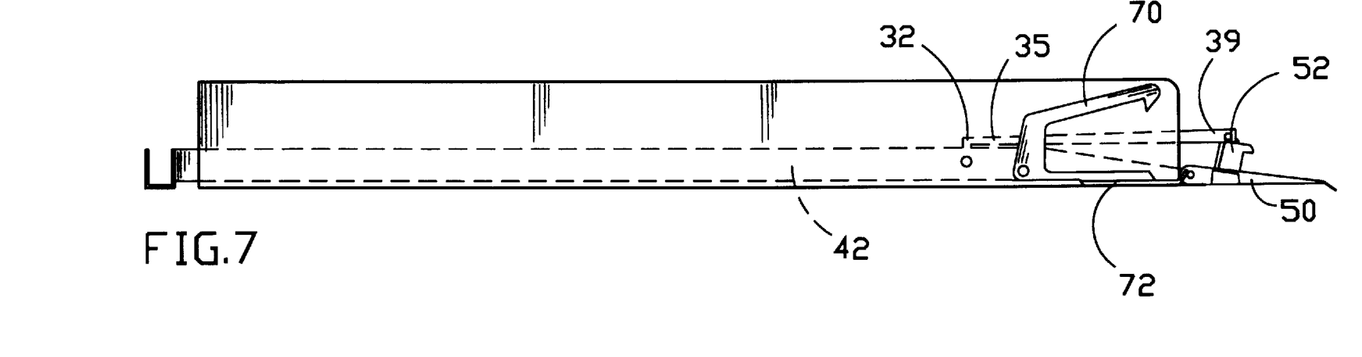
FIG. 7 is a side elevational view of one side of the platform, with the roll stop in the opened position.

FIG. 2 depicts the platform 22 incorporated with the present invention power controlled safety barrier or power roll stop 10, wherein the safety barrier or roll stop 50 is in an opened position. FIG. 6 depicts the platform 22 incorporated with the present invention power roll stop 10, wherein the roll stop 50 is in a closed position. Referring to FIGS. 2 and 6, the power roll stop 10 comprises a motor drive assembly 14, a linkage mechanism 28, and a safety barrier or roll stop 50. The power roll stop 10 can be used in conjunction with and mounted within the wheelchair lift 2 (see FIG. 1) which comprises the platform 22 having an outer edge 26. The platform 22 has a build-in disc type small enclosure 25 located on one side of the platform 22 to accommodate the motor drive assembly 14 which powers the power roll stop 10. A top cover (not shown) is provided for covering the enclosure 25 and coplanar to an upper surface of the platform 22.

Figure 9:
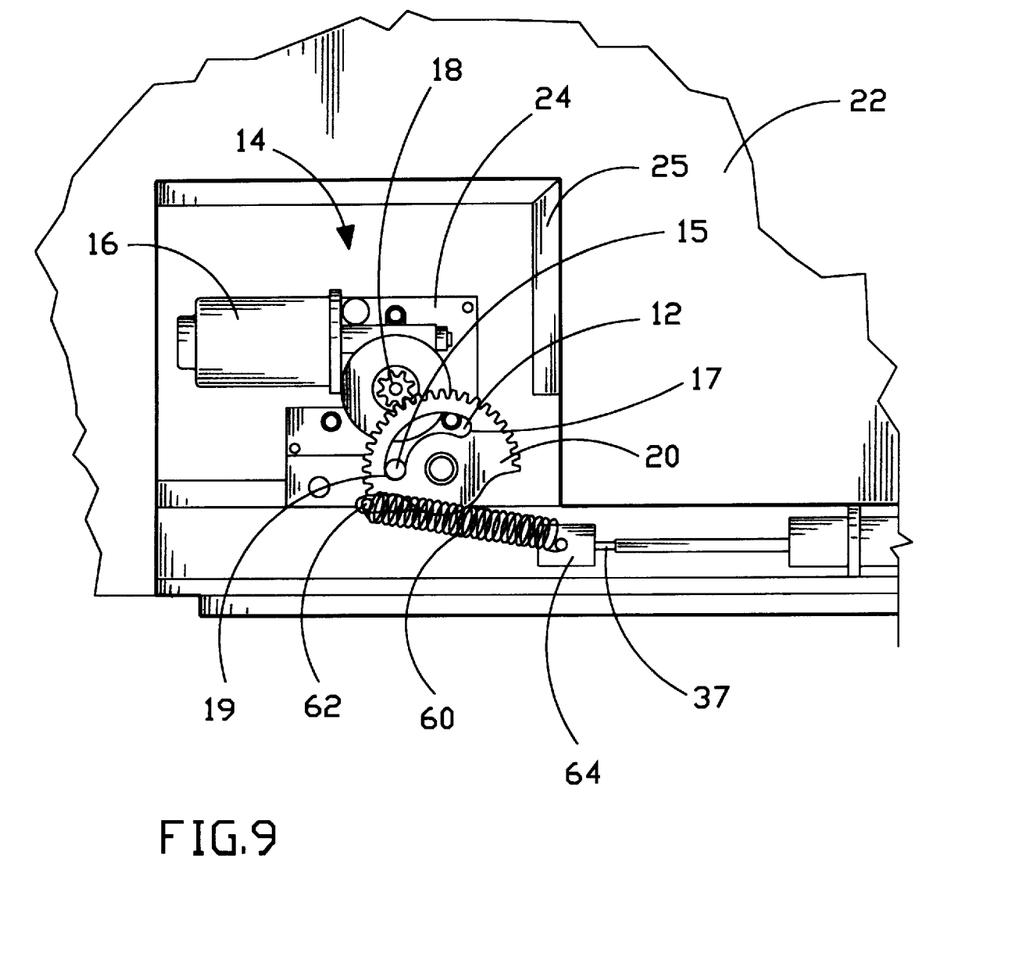
FIG. 9 is an enlarged plan view of a motor drive assembly.

Referring to FIGS. 2, 6 and 9, the motor drive assembly 14 comprises a motor bracket 24 which is mounted in the enclosure 25, an electrical motor 16 mounted on the bracket 24, a driving gear 18 rotatably mounted on a driving shaft of the motor 16, and a driven gear 20 rotatably mounted on the motor bracket 24. Each gear has teeth for engaging with each other. The driving gear 18 and driven gear 20 have formed a required output torque and speed. A radial groove type opening 12 is provided on the driven gear 20 to define a rotation range for the driven gear 20. A stop roller on stud 15 fixed on the motor bracket 24 and is adapted to receive within the radial groove opening 12 to terminate the rotational movement of the driven gear 20 when the stop roller 15 engages ends 17 and 19 formed on the groove opening 12.

Referring to FIGS. 2, 3, 4, 5, and 6, the linkage mechanism 28 is mounted within one side mounting frame bar 42 of the platform 22. The linkage mechanism 28 comprises an elongated proximal linkage bar 30, an elongated distal linkage bar 35, and a flexible linkage member 60, preferably a spring. The proximal 30 and distal 35 linkage bars are pivotaly connected at their respective adjacent ends 34 and 32 by a lockable pin means 40, and substantially extended horizontally on their other ends 37 and 39. The linkage bar 35 is located above the side mounting frame bar 42 of the platform 22, where the inner end 32 extends inside of the side mounting frame bar 42 through a slot opening 54 formed on top of the side mounting frame bar 42 to pivotally connect to the outer end 34 of the proximal linkage bar 30. The outer end 39 is pivotally connected to a fixed anchor 66 which is mounted on and projected outwardly from the roll stop 50 (see FIGS. 2 and 6). The proximal linkage bar 30 is mounted inside of the side mounting frame bar 42 and is slidably received within a guide bushing 55 which is fixed relative to an inner wall of the side mounting frame bar 42 by a pair of brackets 56 and 58 (see FIGS. 2 and 5).

Figure 4:
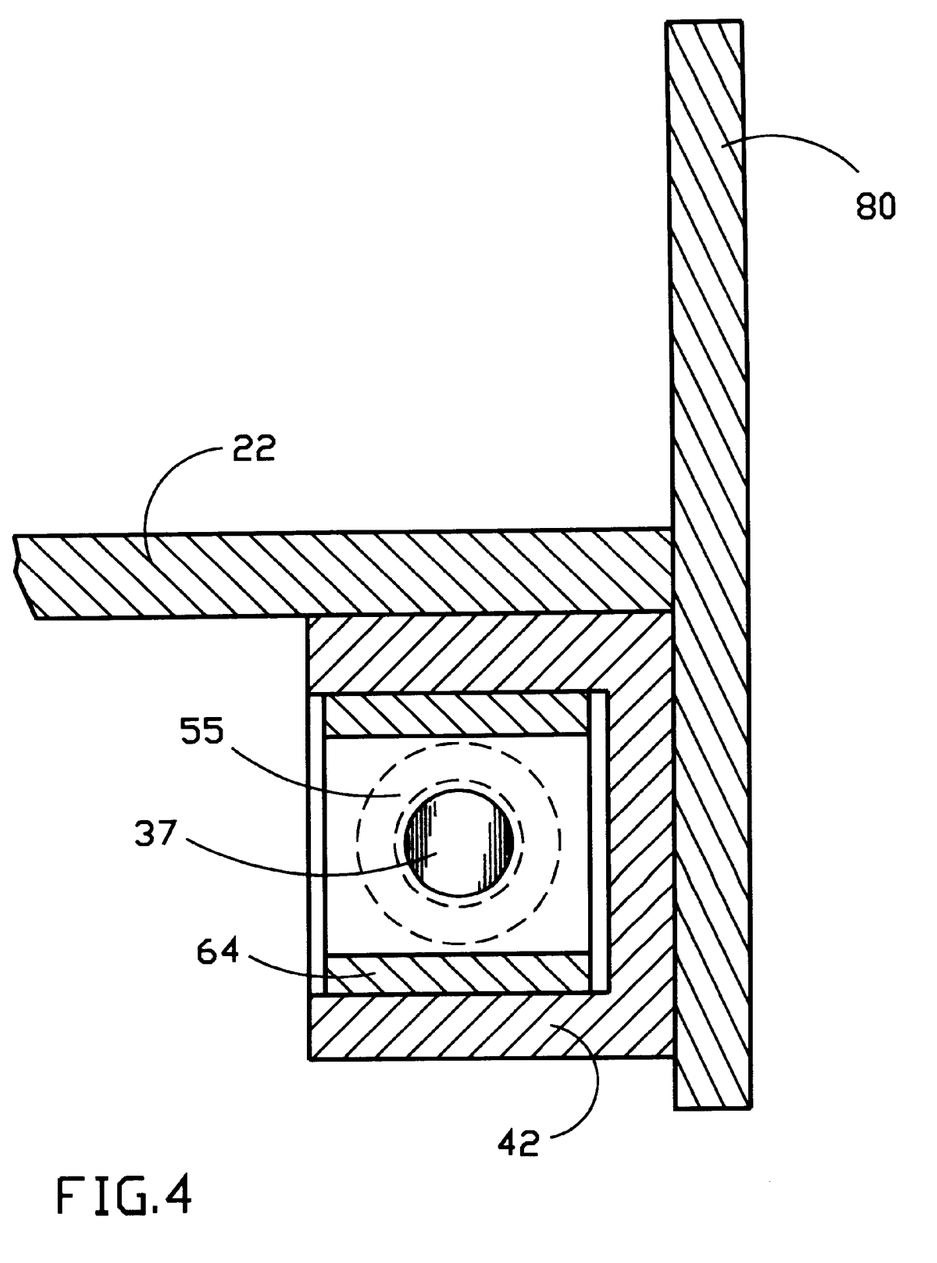
FIG. 4 is an enlarged cross-sectional view taken along line 4—4 of FIG. 2.
Figure 5:
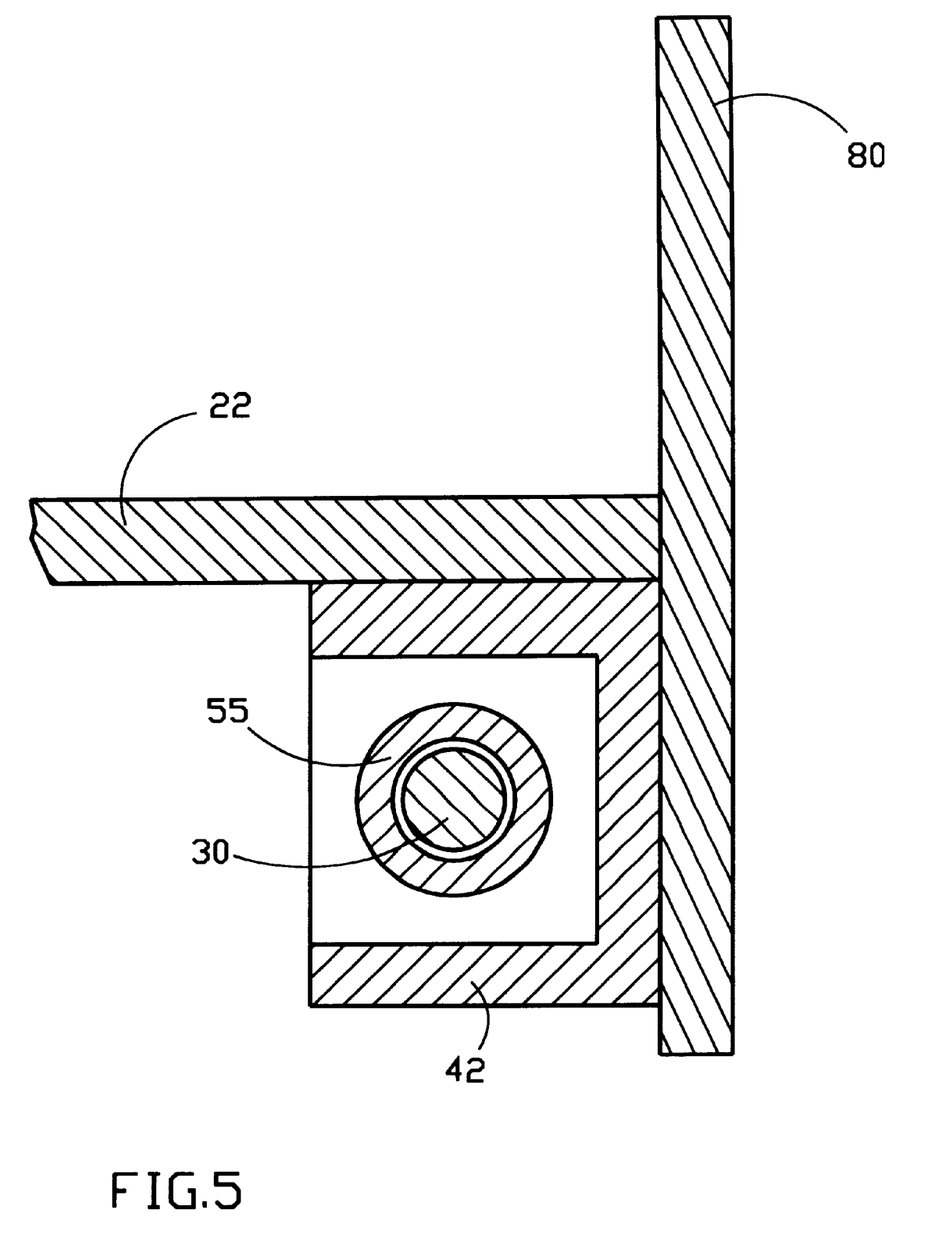
FIG. 5 is an enlarged cross-sectional view taken along line 5—5 of FIG. 2.

Referring to FIGS. 2, 4 and 9, the flexible spring 60 is connected between the motor drive assembly 14 and the two linkage bars 30 and 35. The flexible spring 60 is designed and manufactured in a certain way so that it is rigid enough to transfer the thrust force from the motor drive assembly 14 to the linkage bars 30 and 35 to move the roll stop 50 to the closed or opened position. The two opposite ends of the flexible spring 60 are respectively connected to a thumb shaped projected portion 62 on the driven gear 20 and the inner end 37 of the proximal linkage bar 30 through an "⊐" shaped bracket 64.

Figure 8:
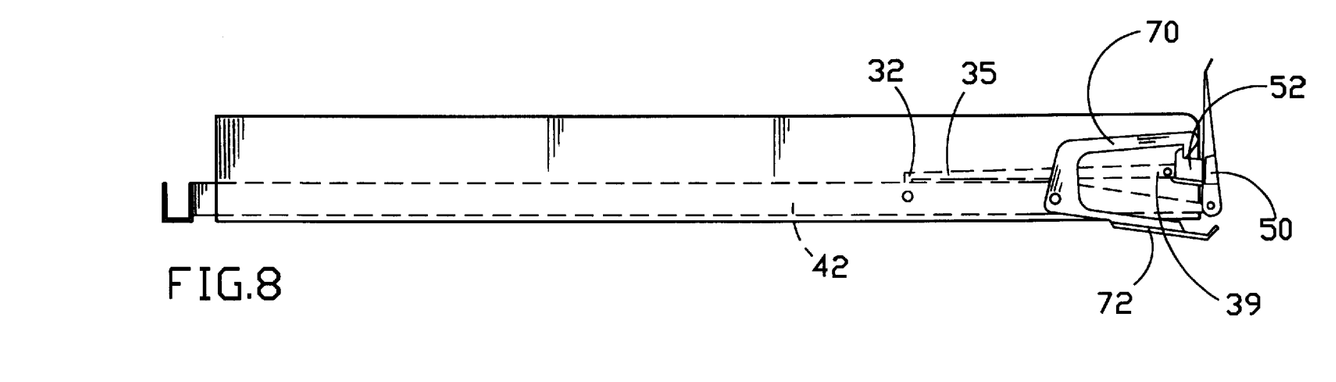
FIG. 8 is a side elevational view of the same side of the platform shown in FIG. 7, with the roll stop in the closed position.

In the power controlled mode, the motor 16 is activated to move the driving gear 18 which in turn rotates the driven gear 20 in a clockwise or a counter-clockwise direction for moving the roll stop 50 between an open and closed position. As one embodiment presented here, the driven gear 20 rotates clockwise to activate the flexible spring 60 which in turn pulls the linkage bars 30 and 35 for moving the roll stop 50 to the closed position (see FIGS. 6 and 8). The opening 12 on the driven gear 20 is configured in such a way that when the driven gear 20 stops at end 19 of the opening 12 during the clockwise rotation, the roll stop 50 is in the fully closed position which is usually substantially vertical to the platform 22. When the roll stop 50 is closed, it is preferred that the flexible spring 60 is in its nominal length as to have the least thrust force applied on the linkage bars 30, 35 and the roll stop 50 in the open direction. It is preferable not to have the excessive force in the power roll stop system to open the roll stop 50 while it is in the closed position. On the other hand, when the driven gear 20 rotates counter-clockwise, it stops at end 17 on the radial groove opening 12 to more the roll stop 50 to the fully open position which is substantially horizontal and is to be an extension of the platform 22. In this position, it is required that the flexible spring 60 is compressed until ideally bent towards the interior side of the platform 22. In order to do that, the spring 60, the radial groove opening 12 and the thumb portion 62 on the driven gear 20 need to be properly designed and mounted. By this arrangement, the flexible spring 50 exerts a moderate amount of thrust force applied to the linkage bar 30, 35 and the roll stop 50 in the open direction.

More details of the flexible member 60 in the present invention will be discussed below. In general, this element 60 should be rigid enough to enable it to transfer forces between the actuating means 14 and the linkage members 30 and 35 for opening and closing the roll stop 50 under the normal power operation. However, the element 60 should have enough flexibility to be extendible if the manual operation is required in some situations such as backup operations for the power failure. As one embodiment in this invention, an extension spring 60 is utilized which makes it possible for the roll stop 50 to be operational by both power and manual controls. The spring 60 (shown in the FIG. 6) is preferred to be in its nominal length or may be slightly extended while the roll stop 50 is in the fully closed position which allows extension of the spring 60 to more the roll stop 50 to the opened position under a manual force. In the fully opened position shown in the FIG. 2), the spring 50 is bent in order to facilitate the movement of the roll stop 50 to the closed position by manual operation, in which the spring 60 may be further bent. Although many conventional spring means can be used, by way of example only, the flexible spring 60 may be an extension spring, part number S-599, commercially available from Century Spring Corporation located in Los Angeles.

Referring to FIGS. 7, 8, 10, and 11, to ensure the roll stop 50 is locked in the fully closed position as described above, additional mechanical locking mechanisms are relatively mounted on both outer front ends of the side mounting frame bars 42 and 142. Two opposite mechanical locking mechanisms are provided located respectively in the front end of the side mounting frame bars 42 and 142. Since those two locking mechanisms are substantially identical, only one will be described in detail.

The locking mechanism in the side mounting frame bar 42 comprises a ski member 70 which is spring loaded and pivotally mounted on the front end of the side mounting frame bar 42 and a latch foot 52 which is fixed on the roll stop 50. When the roll stop 50 is in the fully closed position, it is automatically locked by the ski member 70, which latches to the latch foot 52 (see FIG. 8), where the lower side of the ski member 70 forms a ski plate 72 maintained in a download acute angle relative to the horizontal plane during the lift's loading operation.

When the platform 22 of the wheelchair lift has reached the ground position, the ski plate 72 of the ski member 70 contacts the ground first and pivot counter-clockwisely to the horizontal plane as to unlock the ski member 70 form the latch foot 52 so that it allows the roll stop 50 to unlock first and then rotate to the fully opened position under the normal power controlled operation described previously.

Figure 10:
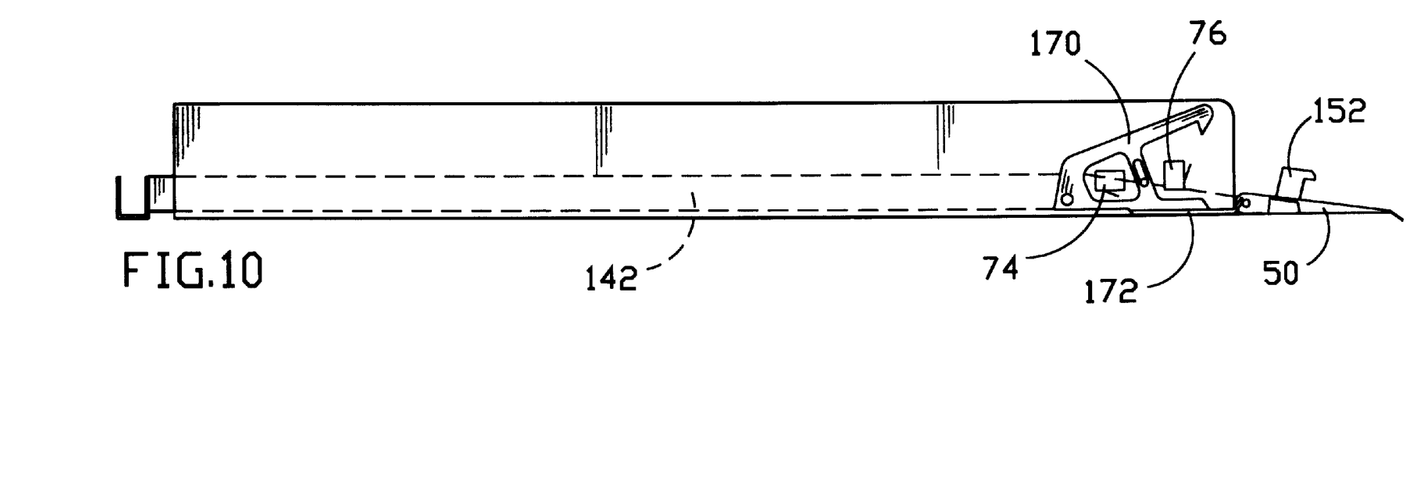
FIG. 10 is a side elevational view of the other side of the platform, with the roll stop in the opened position.
Figure 11:
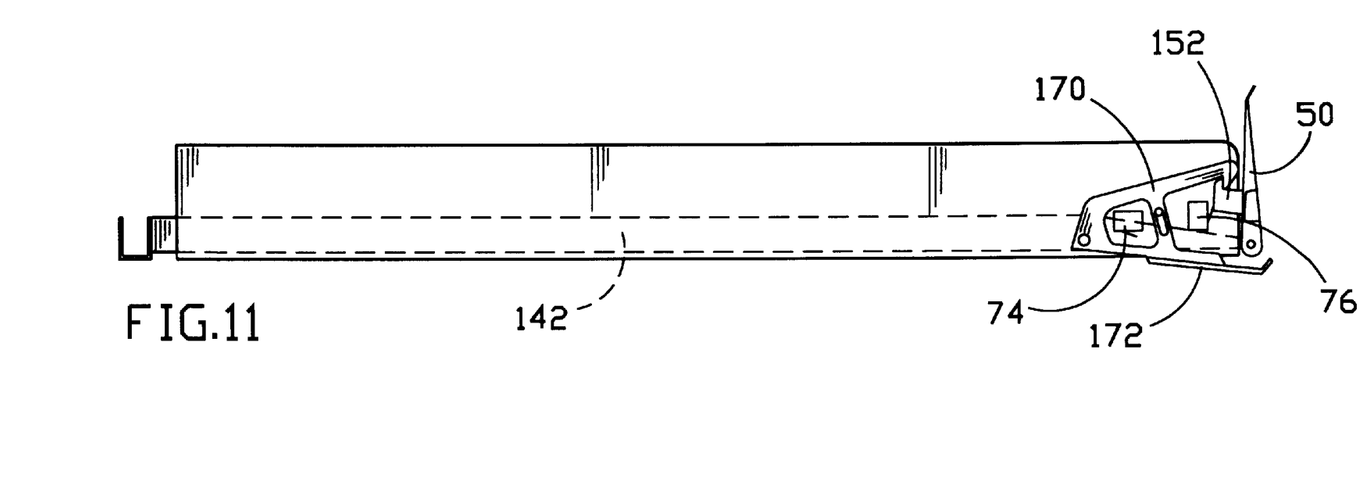
FIG. 11 is a side elevational view of the same other side of the platform shown in FIG. 10, with the roll stop in the closed position.

Referring to FIGS. 10 and 11, it shows the other side of the platform 22 of the wheelchair lift 2, where another ski member 170 is located on the side mounting frame bar 142 and latches to the latch foot 152 to lock the roll stop 50 in the closed position. As a safety feature, an electric control means is provided to conditionally activate the power for the motor means of the roll stop system and the power source of the whole lift upon the positions of the platform so that the power operations of the lift and the roll stop will be sequentially controlled and will not interfere with each other. For the electric control functions, there are two position limit switches 74 and 76 located adjacent to the ski member 170. The position limit switch 74 is to control the motor drive assembly 14. The position limit switch 76 is to control the lift motor control. Generally, these two limit switches 74 and 76 are connected to a main lift electrical control circuit (not shown) and mechanically should not be actuated at the same time to avoid the motion interference. In this arrangement, the switch 74 is positioned in such a way that it may be actuated only when the platform 22 has reached the ground position. The switch 76 is positioned in a way that it may be actuated only when the roll top 50 is in the fully closed position. More specifically, in the fully closed position shown in the FIG. 11, the lift can be operated but the roll stop 50 is unable to move under the power controlled mode. Referring to FIG. 10, when the lift has reached the ground position, the roll stop 50 is able to move by the motor drive assembly 14 while the lift operation is disabled. By this arrangement, the lift's electric sequential control is fully implemented and the safety features are accomplished in the present invention.

In general, the manual control for the power roll stop 10 is not necessary unless an emergency situation occurs such as the power or the motor drive assembly 14 becomes inoperable. To manually open the roll stop 50 (assuming it is from the fully closed position), pivot the ski members 70 and 170 upwardly to release the mechanical locking mechanism between the ski members 70 and 170 and the latch feet 52 and 52 and then naturally rotate the roll stop 50 to the open position. One should realize that the roll stop 50 will be automatically closed upon releasing the manual force from the roll stop 50 because of spring loaded functions designed in the roll stop 52, the ski members 70 and 170, and the spring linkage member 60. One of the unique features of the present invention power controlled safety barrier is that due to the spring member 60, no additional parts, tools or other assembling, disassembling operations are required in the manual operation.

Defined in detail, the present invention is a wheelchair lift, comprising: (a) a platform having an outer entrance edge; (b) a roll stop pivotably connected on the outer edge of the platform, where the roll stop is moveable between an opened position when the platform engages the ground for permitting movement of the wheelchair over the roll stop and across the platform edge, and a closed position for physically blocking movement of the wheelchair across the platform edge when the platform is away from the ground; (c) a linkage mechanism including an elongated distal linkage bar, an elongated proximal linkage bar, and a flexible spring member, the proximal and distal linkage bars pivotally coupled to each other at adjacent ends, the free end of the distal linkage bar pivotally coupled to the roll stop, and the free end of the proximal linkage bar connected to the flexible spring member; (d) a motor drive assembly including a motor, a driving gear electrically coupled to the motor, and a driven gear engaged with the driving gear and connected to the other end of the flexible spring member, such that when the motor is actuated, the motor rotates the driving gear which in turn rotates the driven gear to activate the flexible spring member which in turn moves the linkage bars away from the motor drive assembly to open the roll stop in the opened position, or to close the roll stop in the closed position; and (e) means for maintaining the roll stop in its closed position when the platform is raised or lowered.

Defined broadly, the present invention is a platform safety barrier used in conjunction with a wheelchair lift for preventing a wheelchair from inadvertent movement across an outer edge of the platform, the barrier comprising: (a) a roll stop pivotable on the outer edge of the platform, where the roll stop is moveable between an opened position when the platform engages the ground for permitting movement of the wheelchair over the roll stop and across the platform edge, and a closed position for physically blocking movement of the wheelchair across the platform edge when the platform is away from the ground; (b) a linkage mechanism including a distal linkage bar, a proximal linkage bar, and a flexible spring means, the proximal and distal linkage bars pivotally coupled to the roll stop, and the free end of the proximal linkage bar connected to the flexible spring means; (c) a motor drive assembly including a motor, a driving gear coupled to the motor, and a driven gear engaged with the driving gear and connected to the other end of the flexible spring means, such that when the motor is actuated, it rotates the driving gear which in turn rotates the driven gear to activate the flexible spring means which in turn moves the linkage bars away from the motor drive assembly to open the roll stop in the opened position, or moves the linkage bars away from the roll stop to close the roll stop in the closed position; and (d) means for maintaining the roll stop in its closed position when the platform is raised or lowered.

Defined more broadly, the present invention is a platform safety barrier used in conjunction with a wheelchair lift for preventing a wheelchair from inadvertent movement across an outer edge of the platform, the barrier comprising: (a) a roll stop means pivotably mounted on the outer edge of the platform, where the roll stop means is moveable between an opened position when the platform engages the ground for permitting movement of the wheelchair over the roll stop means and across the platform edge, and a closed position for physically blocking movement of the wheelchair across the platform edge when the platform is away from the ground; (b) a linkage mechanism including a pair of linkage members pivotally coupled to each other at adjacent ends and a flexible linkage member, the free end of the one of the pair of linkage members pivotally coupled to the roll top means, the free end of the other one of the pair of linkage members connected to the flexible linkage member; and (c) an actuating means connected to the other end of the flexible linkage member such that when the actuating means activates the flexible linkage member, the roll stop means moves to the opened position or to the closed position.

Defined even more broadly, the present invention is a platform safety barrier used in conjunction with a wheelchair lift for preventing a wheelchair from inadvertent movement across an outer edge of the platform, the barrier comprising: (a) a roll stop means pivotally mounted on the outer edge of the platform and moveable between an opened position and a closed position; (b) an actuating means; and (c) a linkage mechanism connecting the actuating means and the roll stop means, the linkage mechanism includes a flexible linkage member for permitting both powered and manual operations of the roll stop means between the opened and closed positions.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown in intended only for illustration and for disclosure of an operative embodiment and not to show all of the various forms or modifications in which the present invention might be embodied or operated.

The present invention has been described in considerable detail in order to comply with the patent laws by providing fully public disclosure of at least one of its forms. However, such detailed description is not intended in any way to limit the broad features or principles of the present invention, or the scope of patent monopoly to be grated.

What is claimed is:

1. A platform safety barrier for a wheelchair lift having a platform with an outer edge, the safety barrier comprising:
   a. a roll stop plate pivotally mounted to said outer edge of said platform;
   b. an elongated linkage rod having one end pivotally connected to said roll stop plate;
   c. spring means connected to another end of said elongated linkage rod;
   d. a motor mounted to said platform and having driving means connected to said spring means for automatically moving said roll stop plate between an open position and a closed position depending on the position of said platform; and
   e. said spring means being compressible and extendible under manual force to allow said roll stop plate to be manually moved between said open position and said closed position while said driving means is still connected to said spring means;
   f. whereby said safety barrier prevents a wheelchair from inadvertent movement across said outer edge of the platform as the platform is raised or lowered.

2. The platform safety barrier in accordance with claim 1, wherein said driving means of said motor includes a driving gear engaged with a driven gear which in turn is connected to said spring means, such that when said motor is actuated, said motor rotates the driving gear, which in turn rotates the driven gear to move said spring means, which in turn exerts a force onto and moves said elongated linkage rod forward or backward, to move said roll stop plate between said open position and said closed position.

3. The platform safety barrier in accordance with claim 1, further comprising means for manually locking said roll stop plate in said closed position and unlocking said roll stop plate in said open position.

4. The platform safety barrier in accordance with claim 1, further comprising electrical control means for conditionally activating said motor based on the position of said platform.

5. A platform safety barrier for a wheelchair lift having a platform with an outer edge, the safety barrier comprising:

a. a roll stop plate pivotally mounted to said outer edge of said platform;
b. at least two linkage arms pivotally coupled to each other at their adjacent ends, and a free end of one of the at least two linkage arms pivotally attached to said roll stop plate;
c. a spring means having one end connected to a free end of the other one of said at least two linkage arms;
d. a motor mounted to said platform and having driving means connected to another end of said spring means for automatically moving said roll stop plate between an open position and a closed position and a closed position; and
e. said spring means being compressible and extendable under manual force to allow said roll stop plate to be manually moved between said open position and said closed position while said gear means is still connected to said spring means;
f. whereby said safety barrier prevents a wheelchair from inadvertent movement across said outer edge of the platform as the platform is raised or lowered.

6. The platform safety barrier in accordance with claim 5, further comprising means for manually locking said roll stop plate in said closed position and unlocking said roll stop plate in said opened position.

7. The platform safety barrier in accordance with claim 6, wherein said means for locking said roll stop plate comprises a mechanical locking mechanism including a spring loaded ski member being pivotally mounted to said platform adjacent to said outer edge of said platform and latching to a latch foot.

8. The platform safety barrier in accordance with claim 5, further comprising electrical control means for conditionally actuating said motor to open or close said roll stop plate based on the position of said platform.

9. The platform safety barrier in accordance with claim 8, wherein said electrical control means activates the power to said motor for opening or closing said roll stop plate when said platform is in a ground level position.

10. The platform safety barrier in accordance with claim 8, wherein said electrical control means deactivates the power to said motor when said platform is away from said ground level position.

11. The platform safety barrier in accordance with claim 5, wherein said spring means is a spring member.

12. The platform safety barrier in accordance with claim 5, wherein said gear means includes a driving gear engaged with a driven gear which in turn is connected to said spring means, such that when said motor is actuated, said motor rotates the driving gear, which in turn rotates the driven gear to move said spring means, which in turns exerts a force onto the moves said at least two linkage arms forward or backward, to move said roll stop plate between said open position and said closed position.

13. The platform safety barrier in accordance with claim 12, wherein said driven gear includes a radial groove opening for defining a rotational range of said driven gear.

14. The platform safety barrier in accordance with claim 13, further comprising a stop roller for moving within said groove opening to terminate the rotational movement of said driven gear.

15. A platform safety barrier for a wheelchair lift having a platform with an outer edge, the safety barrier comprising:
a. a roll stop plate pivotally mounted to said outer edge of said platform and movable between an open position when said platform engages a ground level position and a closed position when said platform is away from the ground level position;
b. a distal linkage bar and a proximal linkage bar pivotally coupled to each other at their adjacent ends, a free end of the distal linkage bar pivotally coupled to said roll stop plate;
c. spring means connected to another end of said elongated linkage bar;
d. a motor mounted to said platform and coupled to a driving gear which is engaged with a driven gear and connected to another end of said spring means;
e. said motor being actuated when said platform is at the ground level position, to move said roll stop plate to said open position, through engagement of said driving gear, said driven gear, said spring means, and said distal and proximal linkage bars;
f. said motor also being actuated when said platform is away from ground level position, to move said roll stop plate to said closed position, through engagement of said driving gear, said driven gear, said spring means, and said distal and proximal linkage bars;
g. said spring means member being compressible and extendable under manual force to allow said roll stop plate to be manually moved between said open position and said closed position while said driven gear and said free end of said proximal linkage bar are still connected to said spring means; and
h. means for manually locking said roll stop plate in said closed position when said platform is away from said ground level position;
i. whereby said safety barrier prevents a wheelchair from inadvertent movement across said outer edge of the platform as the platform is raised and lowered.

16. The platform safety barrier in accordance with claim 15, further comprising electrical control means for conditionally actuating said motor.

17. The platform safety barrier in accordance with claim 15, wherein said locking means comprises a mechanical locking mechanism for locking said roll stop plate in said closed position, the mechanical locking mechanism further comprising a spring loaded ski member pivotally mounted to said platform adjacent to said outer edge of said platform, where the ski member latches to a latch foot to secure said roll stop plate in said closed position.

18. The platform safety barrier in accordance with claim 15, wherein said driven gear includes a radial groove opening for defining a rotational range of said driven gear.

19. The platform safety barrier in accordance with claim 18, further comprising a stop roller for moving within said groove opening to terminate the rotational movement of said driven gear.

20. A wheelchair lift, comprising:
a. a platform having an outer entrance edge;
b. means for raising and lowering said platform;
c. a roll stop plate pivotally mounted on said outer edge of said platform and movable between an open position when said platform engages a ground level position and a closed position when said platform is away from the ground level position;
d. a distal linkage bar and a proximal linkage bar pivotally coupled to each other at their adjacent ends, a free end of the distal linkage bar pivotally coupled to said roll stop plate;
e. spring means having one end connected to a free end of said proximal linkage bar;

f. a motor mounted to said platform and coupled to a driving gear which is engaged with a driven gear and connected to another end of said spring means;

g. said motor being actuated when said platform is at the ground level position, to move said roll stop plate to said open position, through engagement of said driving gear, said driven gear, said spring means, and said distal and proximal linkage bars;

h. said motor also actuated when said platform is away from ground level position, to move said roll stop plate to said closed position, through engagement of said driving gear, said driven gear, said spring means, and said distal and proximal linkage bars;

i. said spring means being compressible and extendable under manual force to allow said roll stop plate to be manually moved between said open and said closed position while said driven gear and said free end of said proximal linkage bar are still connected to said spring means; and j. means for manually locking said roll stop plate in said closed position when said platform is away from said ground level position;

k. whereby said safety barrier prevents a wheelchair from inadvertent movement across said outer edge of said platform as said platform is raised or lowered by said means for raising and lowering said platform.

21. The wheelchair lift in accordance with claim 20, further comprising electrical control means for conditionally actuating said motor to open or close said roll stop plate depending upon the position of said platform.

22. The wheelchair lift in accordance with claim 20, wherein said locking means comprises a mechanical locking mechanism for locking said roll stop plate to said closed position, the mechanical locking mechanism further including a spring loaded ski member and being pivotally mounted to said platform and located adjacent to said outer edge of said platform, where the spring loaded ski member latches to a latch foot on said roll stop plate to secure said roll stop plate in said closed position.

23. The wheelchair lift in accordance with claim 20, wherein said driven gear includes a radial groove opening for defining a rotational range movement of said driven gear.

24. The wheelchair lift in accordance with claim 23, further comprising a stop roller for moving within said groove opening to terminate the rotational movement of said driven gear.

* * * * *